June 1, 1937. P. WHITCOMB 2,082,433
POWER TRANSMISSION DEVICE
Filed April 25, 1936 5 Sheets-Sheet 2
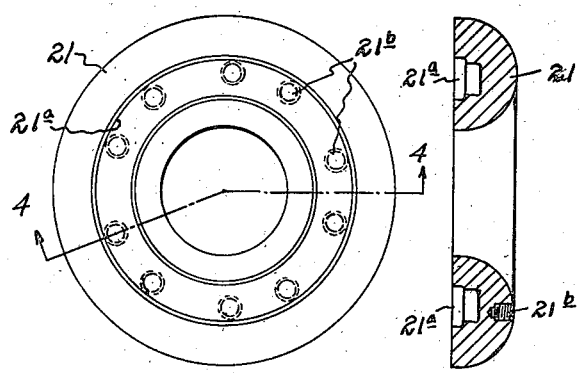
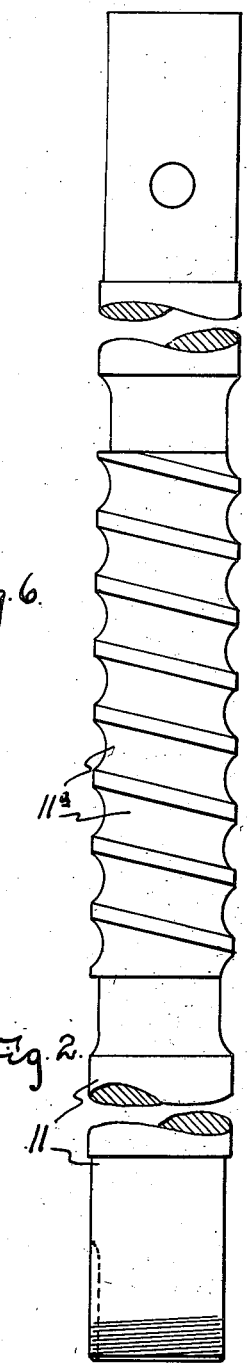
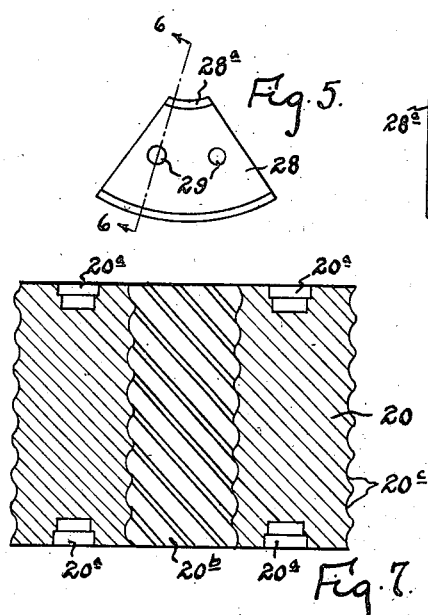
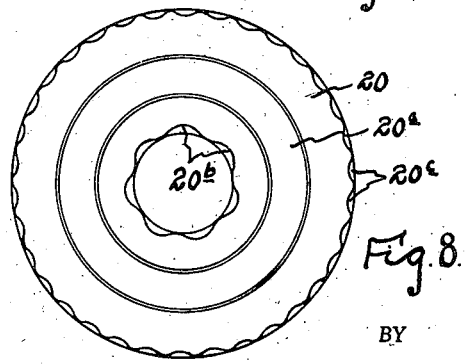
INVENTOR.
Preston Whitcomb
ATTORNEYS

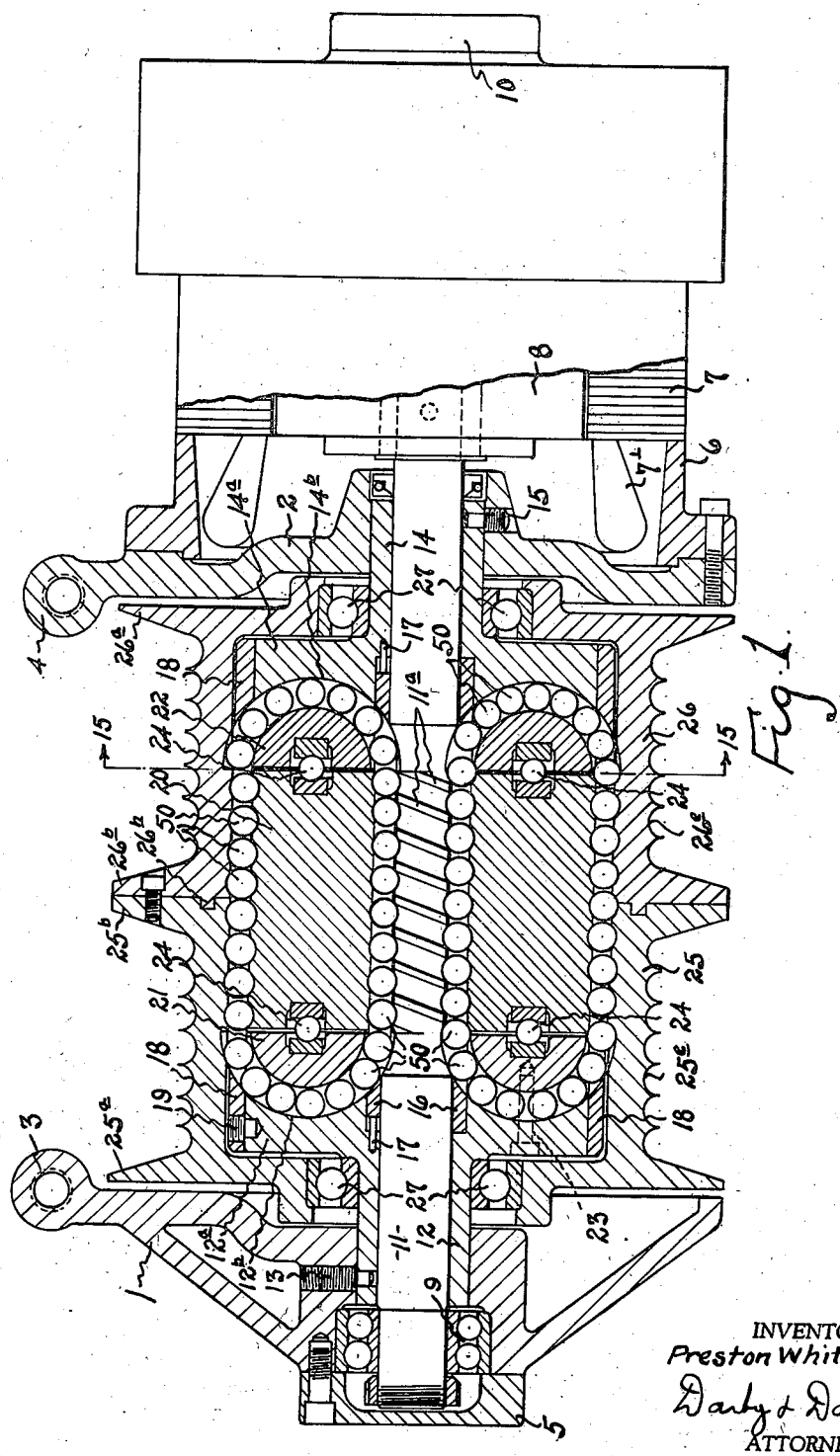

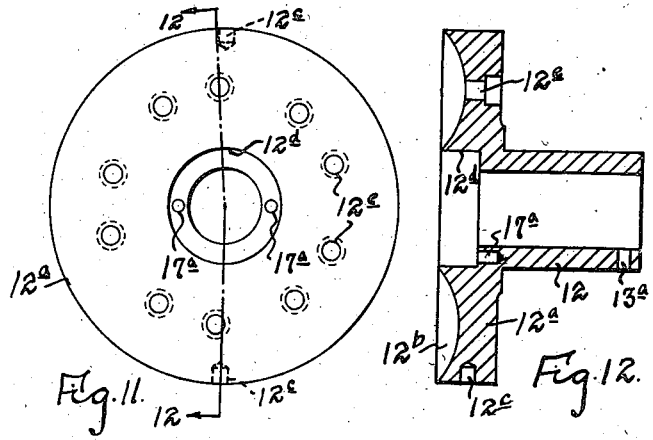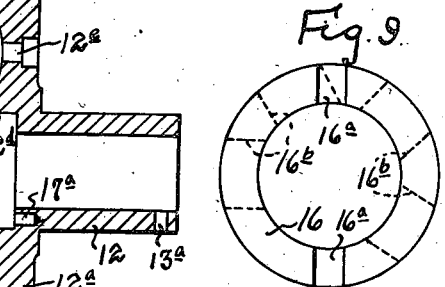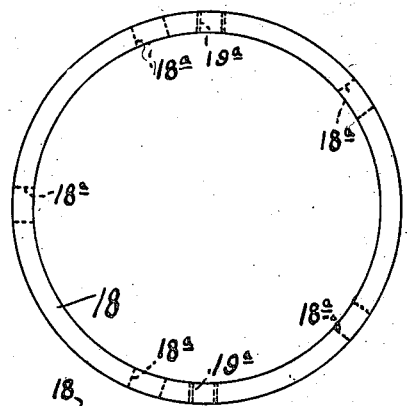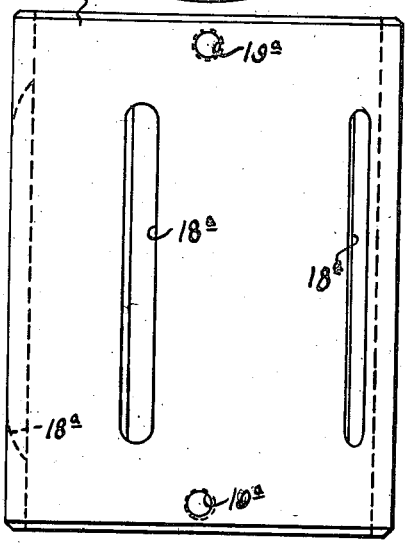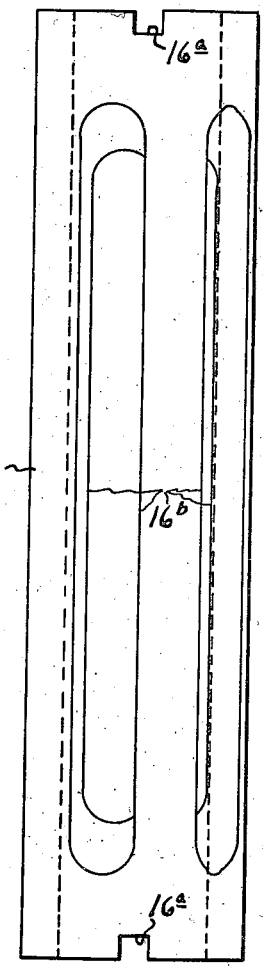

June 1, 1937.  P. WHITCOMB  2,082,433
POWER TRANSMISSION DEVICE
Filed April 25, 1936   5 Sheets-Sheet 4
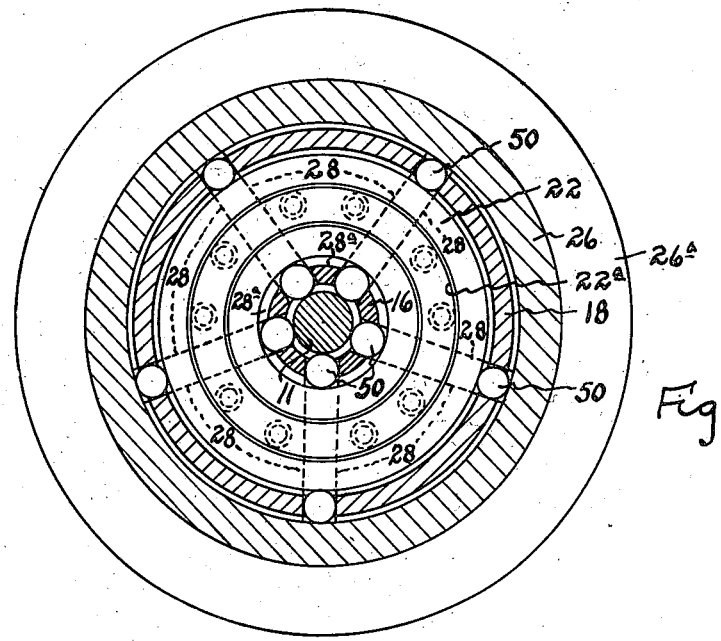
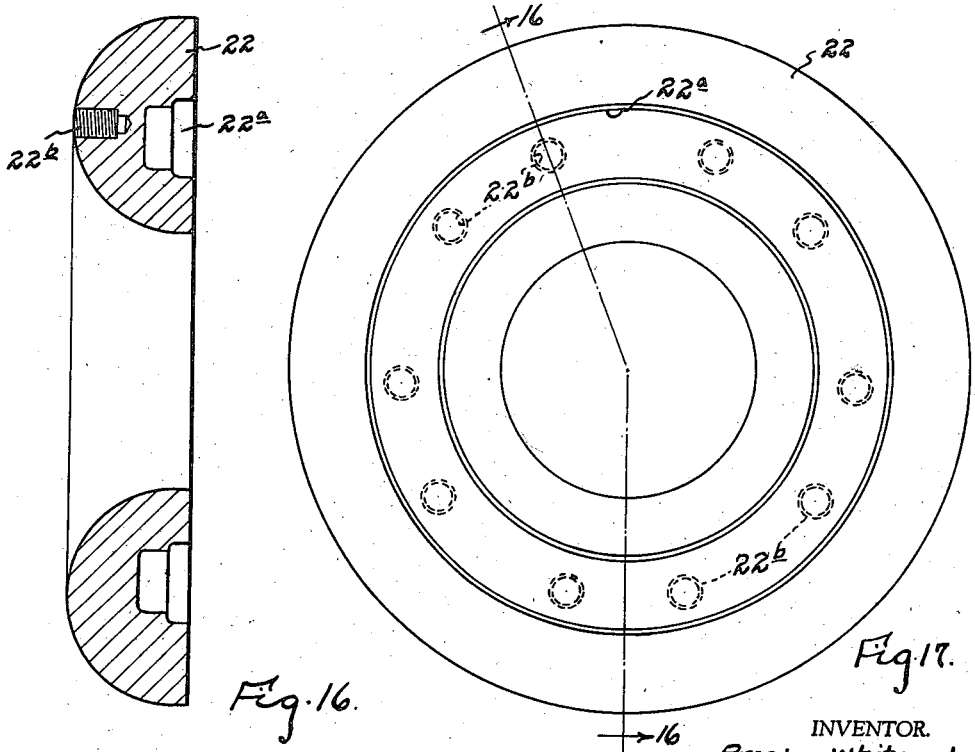
INVENTOR.
Preston Whitcomb
BY Danby & Danby
ATTORNEYS.

June 1, 1937.  P. WHITCOMB  2,082,433
POWER TRANSMISSION DEVICE
Filed April 25, 1936   5 Sheets-Sheet 5

INVENTOR.
Preston Whitcomb
BY
ATTORNEYS.

Patented June 1, 1937

2,082,433

UNITED STATES PATENT OFFICE 2,082,433

POWER TRANSMISSION DEVICE

Preston Whitcomb, Kenmore, N. Y., assignor to Manning, Maxwell & Moore, Inc., New York, N. Y., a corporation of New Jersey Application April 25, 1936, Serial No. 76,320

6 Claims. (Cl. 74—189)

This invention is concerned with improvements in power transmission devices. While the invention is broadly applicable for the purpose of transmitting power from a driver to a driven member with a speed reduction, it has been disclosed herein in the form of a hoist.

A basic object of the invention is to provide a power transmission mechanism employing a series of balls for interconnecting the driving and driven member, which operate in spiral grooves on the members whereby the balls are propelled by the driving member and in their movement cause a proportionate movement of the driven member.

Another object of this invention is to provide a mechanism of this general type in which either a single or a double reduction in speed is effected as between the driving and driven member.

The further object of this invention, namely to provide an efficient power transmission device, is attained by means of the novel ball drive herein employed.

The many detailed objects of this invention which are successfully secured thereby will become apparent in their full scope as the description of the structure and operation proceeds.

This invention resides substantially in the combination, construction, arrangement and relative location of parts, all as will be described in connection with the attached drawings.

In the accompanying drawings,

Figure 1 is a vertical, central, longitudinal view through one form of device in accordance with this invention, which form is specifically that of a hoist;

Figure 2 is a plan view with some parts broken away of the inner drive screw or worm shaft;

Figure 3 is a front elevational view of one of the thrust rings, two of which are employed;

Figure 4 is a cross sectional view taken on the line 4—4 of Figure 3;

Figure 5 is a plan view of one of the thrust plate members of which five are employed at each end of the device;

Figure 6 is a cross sectional view taken on the line 6—6 of Figure 5;

Figure 7 is a longitudinal, central, cross sectional view through the intermediate worm member;

Figure 8 is an end elevational view thereof;

Figure 9 is an end elevational view of the inner guide sleeve;

Figure 10 is a side elevational view thereof;

Figure 11 is a front elevational view of one of the guide sleeve plugs of which there are two in the device;

Figure 12 is a cross sectional view taken on the line 12—12 of Figure 11;

Figure 13 is an end elevational view of the outer guide sleeve;

Figure 14 is a side elevational view thereof;

Figure 15 is a cross sectional view taken on the line 15—15 of Figure 1;

Figure 16 is an enlarged cross sectional view on the line 16—16 of the other end thrust ring similar to that of Figure 4;

Figure 17 is a front elevational view thereof;

Figure 18:
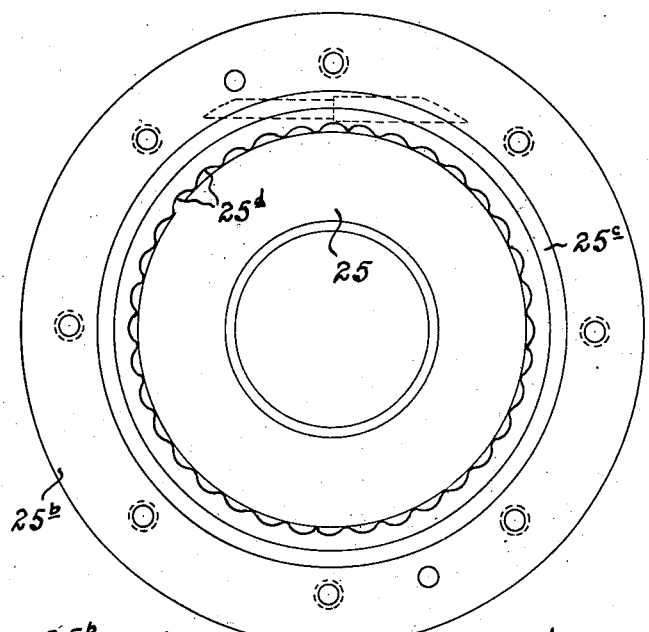
Figure 18 is an end elevational view of the left hand section of the outer drum.

Generally speaking the device of this invention consists of a mechanism by means of which power may be transferred from a driving to a driven member with high efficiency and at a great reduction in speed. To those skilled in the art it will be apparent that a device of this nature is particularly useful in a hoist mechanism, and for this reason the principles of the invention, although not limited to a hoist mechanism, have been shown embodied in such a structure.

The hoist illustrated comprises a pair of end supporting plates or discs 1 and 2 which are provided with apertured lugs 3 and 4 respectively by which the mechanism may be suspended by any suitable means.

The plate 1 is provided with a small end cap 5 which closes a central passage therethrough. The other plate or end member 2 is constructed so as to form the end cover for a motor casing 6 which has been illustrated for purposes of description as an electric motor for driving the hoist. The motor comprises diagrammatically the field magnet 7 provided with the field winding 7' and the armature 8. Supported in the ball bearings 9 at one end and in bearings not shown in the housing 10 at the other end is a shaft 11 which may be secured to or form a continuation of the shaft of the armature 8. This shaft is provided with a continuous thread or worm 11ª. The thread or worm is of the configuration clearly apparent from Figure 2. It is a single left hand thread or worm having a one-half inch lead in the form of the device illustrated.

Mounted in each end or cover plate 1 and 2 are the guide sleeve plugs 12 and 14 respectively. These guide sleeve plugs comprise central sleeve like portions terminating in disc end members 12ᵃ and 14ᵃ respectively. The tubular portion of the sleeve plug 12 is mounted and locked in the end plate 1 by means of the screw pin 13 and similarly the other is locked in the cover plate 2 by means of the screw pin 15. Thus the guide sleeve plugs are fixed in the end caps or members 1 and 2 against either sliding or rotating movement. Figures 11 and 12 show the guide sleeve plugs in full detail. These plugs, of which there are two, are exactly the same. The sleeve portion of the one illustrated has a hole 13ᵃ therein in position to be engaged by the screw pin 13. The plate end 12ᵃ is provided with a counterbore or recess 12ᵈ in alignment with the bore in the sleeve. The face of the disc between the periphery and the recess 12ᵈ is provided with a concave annular surface as illustrated at 12ᵇ. The disc portion also has a series of holes 12ᵉ for a purpose to be described later.

At 16 is a sleeve which is slipped over the shaft 11 and within which the shaft rotates. This sleeve 16, as illustrated in Figures 9 and 10 has a series, five actually, of slots 16ᵇ through the walls thereof and extending for a substantial portion of the length of the sleeve. The ends of the sleeve are provided with notches 16ᵃ in which the pins 17 lie. These pins are mounted in the holes 17ᵃ in the guide sleeve plugs so as to project into the recess 12ᵈ. The ends of the sleeve 16 fit into the recesses 12ᵇ and are prevented from turning with the shaft 11 by reason of the engagement of the pins 17 in the notches 16ᵃ.

At 18 is the outer guide sleeve which is shown in full detail in Figures 13 and 14. It is in the form of a tube having a series, five in number, of slots 18ᵃ through the wall thereof and extending for a substantial portion of the length of the sleeve. The sleeve is provided with several holes 19ᵃ which align with the bores 12ᶜ in the guide sleeve plugs so that the sleeve 18 may be locked thereto at its ends by means of screw pins 19. For purposes of emphasis it will be noted that the inner guide sleeve 16, the guide sleeve plugs 12 and 14, and the outer guide sleeve 18 are all locked together and to the end or cover plates 1 and 2, and do not move.

At 20 is the intermediate worm illustrated in full detail in Figures 7 and 8. It consists of a cylindrical member having a central bore which is provided with a single right hand thread or worm 20ᵇ having a 4½ inch lead. The periphery of the intermediate worm is provided with a single right hand thread or worm 20ᶜ having a 4½ inch lead. The end faces of the intermediate worm are provided with an annular groove 20ᵃ for a purpose to be described later. This intermediate worm surrounds the sleeve 16 and is journaled on the ball bearings 50 and has a groove 20ᵃ at each end in which part of the races for the thrust bearings are mounted.

Disposed at the ends of the intermediate worm are the thrust rings 21 and 22 which are shown in full detail in Figures 3 and 4 and 16 and 17 respectively. Each of these rings is of annular form flanged on one face, and of semicircular cross section. The ring 21 has an annular groove 21ᵃ on its face positioned to take the other race of the ball thrust bearing 24 at the right hand end of the intermediate worm. This ring has a series of threaded holes 21ᵇ in one face thereof by means of which it is securely locked to the guide sleeve plug 14 by means of screws which pass through the disc part of the plug and into the threaded holes in the manner illustrated in connection with the other thrust ring 22 at the left hand end of the intermediate worm, where there is shown in Figure 1 one of the screws 23 by means of which the plug 12 is attached to the ring 21. These screws 23 engage the threaded holes 22 of the ring 22. This ring has an annular groove 22ᵃ which receives the other race of the thrust bearings 24 at the left hand end of the intermediate worm.

Figure 19:
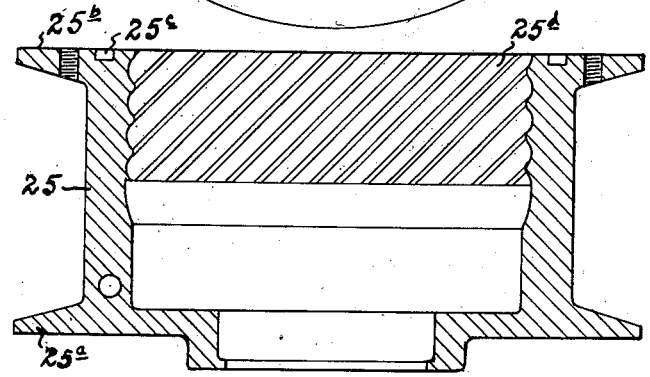
Figure 19 is a central, longitudinal, cross sectional view therethrough.

The outer casing or drum of the device is illustrated as composed of the left and right hand portions 25 and 26. The left hand portion of the drum is fully illustrated in Figures 18 and 19. The right hand portion has not been duplicated in the drawings since it is the same as the left hand portion with the exception that it has an annular ridge 26ʰ on the face of the flange 26ᵇ, as shown in Figure 1, aligned with the annular groove 25ᶜ on the face of the flange 25ᵇ of the left hand section 25 of the drum. The outer ends of the drum sections 25 and 26 are provided with the flanges 25ᵃ and 26ᵃ respectively. A portion of the inner surface of these drums when united is provided with a single left hand thread or worm having an 18 inch lead. Each drum portion is provided with this thread or groove in a manner so that the pairs match up to provide a continuous thread or groove on the inner face of the assembled drum. The thread or groove for the left hand section is shown at 25ᵈ in Figures 18 and 19. The two drum sections are united by screws which pass through the abutting flanges 25ᵇ and 26ᵇ as is clear from Figure 1. Together they form a casing which completely surrounds certain of the members, as is clear from Figure 1, which casing is journaled on the guide sleeve plugs by means of the ball bearings 27 so that it may rotate thereon. As illustrated in Figure 1, the outer surface of the drum sections is provided with a helical groove 25ᵉ and 26ᵉ on which the hoist cable may be wound in a uniform layer. However, the periphery of the drum may be entirely smooth, and for this reason this variation has been shown on the drum section in Figure 19. Other forms of surfaces can be employed. However, if the drum is to be employed as a pulley it would have a smooth surface as illustrated in Figure 19, so that a belt can be driven from it.

Secured in the concave groove on the face of the disc of each of the guide sleeve plugs are five circumferentially spaced thrust plates which have been fully illustrated in Figures 5 and 6. These thrust plates are segmental in form and are concavo-convex in cross section, as is clear from Figure 6. Each has a pair of holes 29 so that screws may be passed through the holes 21ᵇ and 22ᵇ and the thrust rings 21 and 22 so that the thrust plates are secured thereto to form channels, as is clear from Figure 15. In view of the transverse curvature of the grooves 12ᵇ and 14ᵇ (see Figure 1) and the groove in the disc portion 14ᵃ and the other guide sleeve (not shown) and the cross sectional form of the thrust plates (see Figure 6), the channels between them, which are shown mainly in dotted line in Figure 15 are of uniform width and depth, but are longitudinally curved. These longitudinally curved channels are radially aligned with the grooves 16ᵃ and 18ᵃ of the sleeves 16 and 18 to form continuations of these grooves at each end thereof.

Lying in the longitudinally curved grooves between the thrust plates 28 and in the slots 16ᵃ and 18ᵃ of the sleeves 16 and 18 are a series of hardened steel balls 50. As is clear from Figure 15 there are five groups or sets of these balls which entirely fill these grooves and slots to form a continuous ring of balls of the peripheral form clear from Figure 1. As illustrated in this figure, these balls lie in the helical groove 11a of shaft 11 and in the helical groove 20b in the bore of the intermediate worm 20. They lie in the longitudinally curved channels between the thrust plates 28 which are formed at the sides by the thrust plates 21 and at the top and bottom by the discs 12a and 21, and 14a and 22 respectively.

These balls also lie in the helical groove 20c on the outer surface of the intermediate worm 20 and the helical groove 25d and the corresponding groove in the right hand drum section 26, which spiral groove is on the inner face of the drum sections. In the structure illustrated these balls are ½ inch in diameter, and of course all of the grooves, channels and slots in which they ride are suitably proportioned to accommodate them. The balls of each ring form a substantially continuous flexible chain with a very slight clearance between each of them so as to prevent binding, and yet provide a substantially continuous arrangement, that is there are no major gaps between any pair of adjacent balls.

In the operation of the device when the electric motor 7—8 is energized, shaft 11 is caused to rotate in the bearings 9 and 10. Its rotation will cause the balls in contact therewith to advance depending on both the direction of the thread 11a and the direction of rotation of shaft 11. For purposes of description it will be assumed that the balls in contact with the thread 11 in Figure 1 are moving to the left. As they move to the left they will cause the inner worm 20 to revolve because of their engagement with the thread 20b on the inner bore thereof. Since these threads are right hand with respect to the threads 11a as they are forced along the intermediate worm 20 will be caused to revolve in a direction opposite to the direction of rotation of shaft 11. Those balls in the groove 20c on the periphery of the intermediate worm will move to the right (Figure 1), and as they move will cause the drum 25—24 to revolve in the opposite direction because the threads 25d thereof extend in the opposite direction to the threads 20c of the intermediate worm. The balls in the longitudinally curved passages at each end of the device will move along at the same speed as the balls in the top and bottom horizontal rows, but move freely through these channels since they are smooth walled. Thus the balls of each of the five rings travel in a path which comprises alternate sections which are straight and longitudinally curved. Because of the different pitch of the threads on the various members a substantial reduction in speed of the drum 25—26 with respect to the shaft 11 results. With the particular pitch of the threads as mentioned above a speed reduction of 36 to 1 results.

From the above description it will be apparent that the principles of this invention may be embodied in many other physical forms without departure from the scope thereof. Thus, the principles of the invention may be employed in a device which effects a single speed reduction as distinguished from the double speed reduction effected where there is a driving connection between the intermediate worm and the drum, as is the case of the mechanism here illustrated in detail. I do not, therefore, desire to be strictly limited to the disclosure as given for purposes of illustration, but rather to the scope of the appended claims.

What I seek to secure by United States Letters Patent is:

1. In a device of the type described the combination comprising a driving member having a helical groove on its surface, an apertured driven member surrounding the driving member and having a helical groove on the inner face of its aperture, a sleeve lying between the driving member and the driven member having a plurality of longitudinal slots in the wall thereof, means forming passages which are continuations of said slots and closed on themselves, and a plurality of balls in each of said slots and passages to form continuous chains.

2. In a device of the type described the combination comprising a driving member having a helical groove on its surface, an apertured driven member surrounding the driving member and having a helical groove on the inner face of its aperture, a sleeve lying between the driving member and the driven member having a plurality of longitudinal slots in the wall thereof, means forming passages which are continuations of said slots and closed on themselves, and a plurality of balls in each of said slots and passages to form continuous chains, the helical grooves on the driving and driven members extending in opposite directions.

3. In a device of the type described the combination comprising a driving member having a helical groove on its surface, an apertured driven member surrounding the driving member and having a helical groove on the face of its aperture opposite the groove on the driving member, a sleeve interposed between said members having a plurality of longitudinal slots in the wall thereof, means forming channels which are continuations of the slots at each end, a sleeve surrounding the driven member having a series of slots radially aligned with the slots of the first mentioned sleeve, and a second driven member concentric with the driving member and the first driven member and surrounding them, the first driven member having a helical groove on its periphery and the second driven member having a helical groove on the inner face thereof, and a plurality of groups of balls lying in the slots of said sleeves and said channels to form continuous chains thereof, the slots of the sleeves and said channels being arranged to form a series of closed paths along which the balls of the respective groups move.

4. In a device of the type described the combination comprising a driving member having a helical groove on its surface, an apertured driven member surrounding the driving member and having a helical groove on the face of its aperture opposite the groove on the driving member, a sleeve interposed between said members having a plurality of longitudinal slots in the wall thereof, means forming channels which are continuations of the slots at each end, a sleeve surrounding the driven member having a series of slots radially aligned with the slots of the first mentioned sleeve, and a second driven member concentric with the driving member and the first driven member and surrounding them, the first driven member having a helical groove on its periphery and the second driven member having a helical groove on the inner face thereof, and a plurality of groups of balls lying in the slots of said sleeves and said channels to form continuous chains thereof, the slots of the sleeves and said channels being arranged to form a series of closed paths along which the balls of the respective groups move, each pair of cooperating helical grooves extending in opposite directions with respect to each other.

5. In the combination of claim 3, means for preventing movement of said sleeves.

6. In the combination of claim 4, means for preventing movement of said sleeves.

PRESTON WHITCOMB.